United States Patent
Nozieres et al.

(10) Patent No.: US 6,771,567 B2
(45) Date of Patent: Aug. 3, 2004

(54) DUAL SHIELD VERTICAL MAGNETO-OPTICAL READ HEAD

(75) Inventors: Jean-Pierre Nozieres, Corenc (FR); Sebastien Ferrand, Pont de l'Aru (FR); Yannick Maral, Fleurance (FR); Jean-Christophe Toussaint, Saint-Egreve (FR); Jørn Raastad, Olso (NO)

(73) Assignee: O-Mass AS, Oslo (NO)

( * ) Notice: Subject to any disclaimer, the term of this patent is extended or adjusted under 35 U.S.C. 154(b) by 425 days.

(21) Appl. No.: 09/992,588

(22) Filed: Nov. 6, 2001

(65) Prior Publication Data

US 2003/0086340 A1 May 8, 2003

(51) Int. Cl.⁷ .................................................. G11B 11/00
(52) U.S. Cl. ..................................... 369/13.05; 360/319
(58) Field of Search ......................... 369/13.05; 360/319

(56) References Cited

U.S. PATENT DOCUMENTS 5,568,336 A   10/1996  Jolivet
5,689,391 A   11/1997  Maurice

FOREIGN PATENT DOCUMENTS

FR   2 797 708   8/1999

OTHER PUBLICATIONS

"Magnetooptical Thin Film Reading Head," Hatakeyama et al, Aplied Optics, vol. 25, No. 1, Jan. 1, 1986, pp. 146–150.

"Magneto–Resistive Heads Fundamentals and Applications," Mallinson (1996), pp. 66–69.

*Primary Examiner*—Aristotelis M. Psitos
(74) *Attorney, Agent, or Firm*—Schiff Hardin LLP

(57) ABSTRACT

A magneto-optical read head for detecting magnetic transitions representing data stored in a magnetic recording medium as a sense layer having an optical property that is magnetic field-dependent, two magnetic shield layers respectively disposed on opposite sides of the sense layer and allowing magnetic flux from substantially only one of the magnetic transitions to interact with the sense layer at a time, with one of the magnetic shield layers being transparent at a wavelength allowing light at that wavelength to enter into and exit from the sense layer.

26 Claims, 1 Drawing Sheet

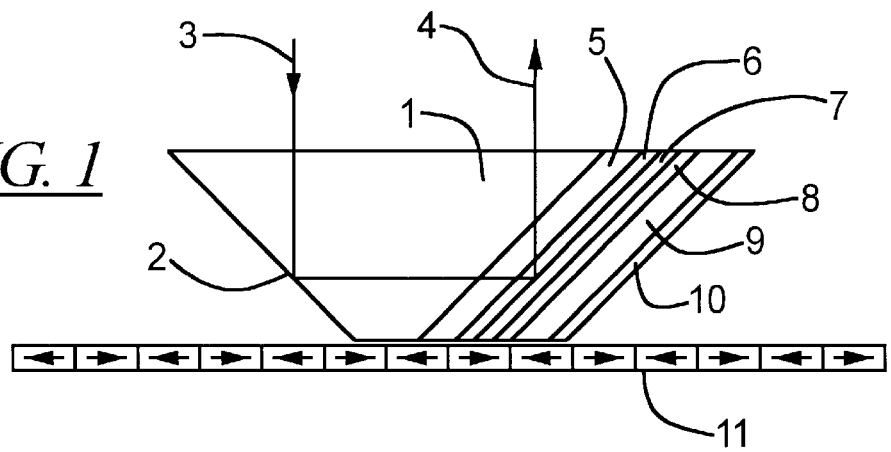
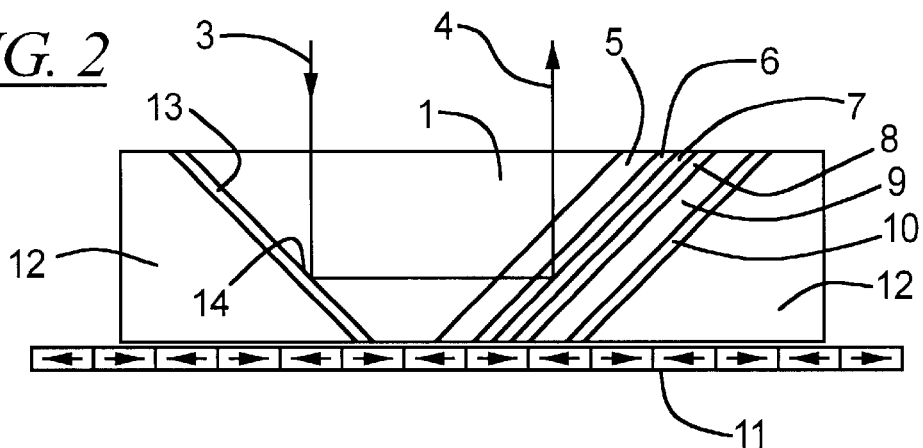
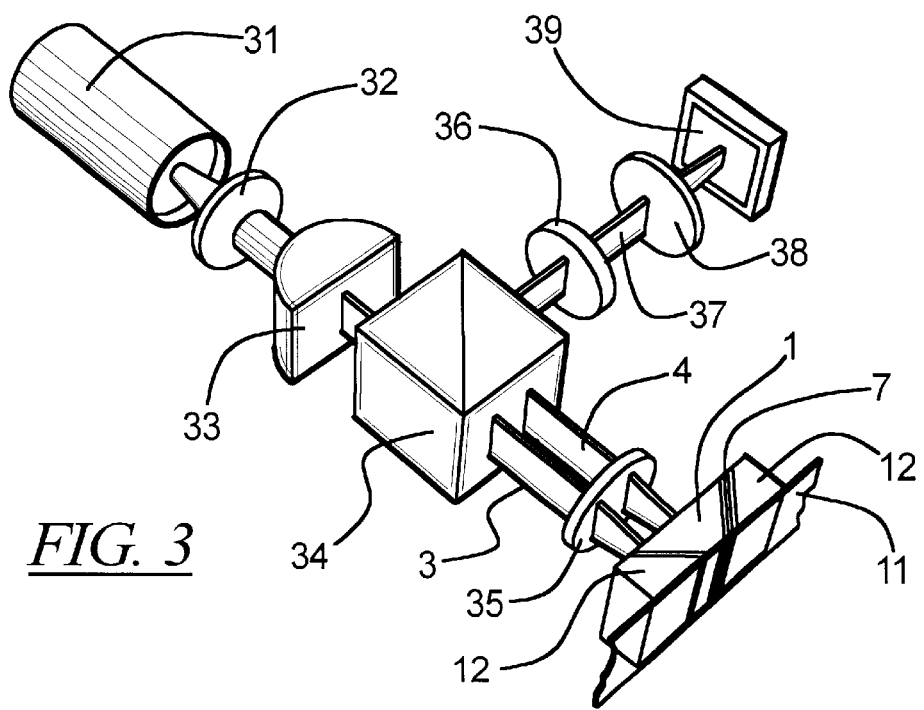

DUAL SHIELD VERTICAL MAGNETO-OPTICAL READ HEAD

BACKGROUND OF THE INVENTION

1. Field of the Invention

The present invention is directed to a vertical magneto-optical head for reading data from a magnetic recording medium, and in particular to a shielded vertical magneto-optical read head.

2. Description of the Prior Art

The basic principles of operation of a magneto-optical head for reading data stored on a magnetic recording medium are described in "magneto-optical thin film reading head," Hatakeyama et al., Applied Optics, Vol. 25, No. 1 (Jan. 1, 1986), pp 146–150. Such a magneto-optical read head is used for detecting magnetic transitions, arising from magnetic fields respectively associated with zeroes and ones in a magnetic storage medium. The magneto-optical read head has a region thereof which is sensitive to such magnetic transitions, such as by changing its polarization or other optical properties dependent on the magnetic field associated with the magnetic transition in the magnetic recording medium.

The magnetic transitions occur in succession along the length of the magnetic recording medium and a problem associated with the magneto-optical recording head disclosed in the Hatakeyama et al. reference is that when responding to the magnetic field associated with the magnetic transition closest to the sensitive region of the head, magnetic fields associated with adjacent transitions in the recording medium can be strong enough to influence, and thereby falsify, accurate detection of the closest magnetic transition. This requires the magnetic transitions on the recording medium to be separated by a certain distance from each other so that when the magneto-optical recording head reads or detects the closest magnetic transition on the recording medium, it is not unduly influenced by the magnetic fields associated with adjacent transitions. This minimum spacing between magnetic transitions means that the linear resolution associated with a magneto-optical head of the type described in Hatakeyama et al. is low. This can be seen from FIG. 8 therein, which shows a practical limit of the linear density as being below 500 bits/mm (i.e., a bit size of more than two $\mu$m). This is more than one order of magnitude too low for competing with currently available commercial products.

To improve the linear density, it is known to introduce a single shield into the structure of a magneto-optical recording head, as described in U.S. Pat. No. 5,568,336 and French Patent 2 797 708. The magneto-optical heads described in those references are formed by a number of successive layers on a substrate, and one of these layers is composed of shield material. The shield material is opaque, and is disposed only on one side of the head, because the other side must be light-transmitting, to allow light to enter into and exit from the gap material and the sensing layer, which is the layer that changes it's optical properties dependent on the presence of a magnetic field. Although this one-shielded design has an improved linear density compared to the unshielded design described in Hatakeyama et al., the linear density associated therewith is still not sufficient for current systems. Another problem associated with this design is that it produces an asymmetric pulse response due to the magnetic structure thereof being asymmetric by design. This makes this single shielded head less desirable in modern read detection channels, such as Partial Response Maximum Likelihood (PRML) channels.

It is also known from the aforementioned French Patent 2 797 708 to provide additional elements (i.e., additional material) at the magneto-optical head in order to support the recording medium and thereby reducing spacing loss during the read-out process.

Another type of known read head is a magneto-resistive head. It is known to construct magneto-resistive heads with a single shielded design as well as with a double shielded design, as described in "magneto-resistive heads: fundamentals and applications," Mallinson (1996) pages 66–69. Double shields, i.e., a magnetic shield on each side of the magneto-resistive layer, can be used in a magneto-resistive head, because the problem of blocking light transmission is not present. Such double-shielded structures were introduced to increase the capability to read data stored with increased linear density, while also maintaining a symmetrical response. Double shielded magneto-resistive heads are currently the most widely used configuration for tape heads in the most recently available commercial products.

SUMMARY OF THE INVENTION

It is an object of the present invention to provide a magneto-optical read head with the capability of reading data having an increased linear density in comparison to currently available magneto-optical read heads. It is a further object of the present invention to provide a magneto-optical read head which is capable of reading data with a linear density comparable to that readable by a double shielded magneto-resistive head.

The above object is achieved in accordance with the principles of the present invention in a dual shield magneto-optical read head having a layer structure, wherein a magnetic shield layer is provided at a side of the sense layer through which light enters and exits, with this shield layer being composed of material which is transparent to light at the employed wavelength.

By employing a magnetic shield layer which is transparent to light at the employed wavelength, magnetic shielding can be provided on both sides of the sense layer, thereby shielding the sense layer from stray magnetic fields on both sides, so as to improve the linear density reading capability. Moreover, since shielding layers are present at both sides of the sense layer, the pulse response asymmetry is reduced, thereby making the magneto-optical read head suitable for use in systems employing detection channels of the type that require a symmetric pulse response. The material forming the transparent shield layer is soft magnetic (high permeability) material which prevents magnetic flux, such as arising from a magnetic transition in the recording medium, from entering into the sense layer, except when the magnetic transition is located between the transparent shield layer and the other shield layer at the opposite side of the sense layer. As noted above, the material is transparent to light at the given wavelength which is employed for read-out.

The shield material in the transparent shield layer is preferably composed of garnet having a composition $A_3X_5O_{12}$, wherein A is one or more of Y, Bi, or any rare earth element, X is one or more of Fe, Ga, Al, In, Sc, Sm or Nd. Examples of suitable compositions are $(Lu_{2.5}Bi_{0.5})(Fe_5)O_{12}$ and $(Tm_{2.5}Bi_{0.5})(Fe_4Ga_1)O_{12}$.

The material forming the transparent shield layer should have approximately the same index of refraction as the substrate material of which the head is formed. The transparent shield layer also preferably has a low Kerr/Faraday rotation. The thickness of the transparent shield layer will depend on the permeability of the material forming the layer, but will typically be in a range between 1 and 2 $\mu$m.

DESCRIPTION OF THE DRAWINGS

FIG. 1 is a side sectional view of a first embodiment of a magneto-optical read head in accordance with the invention, adjacent to a magnetic recording medium.

FIG. 2 is a side sectional view of a second embodiment of magneto-optical read head in accordance with the invention, adjacent to a magnetic recording medium.

FIG. 3 is a schematic illustration of the basic components of an embodiment of a readout system employing the embodiment of the magneto-optical read head of FIG. 2.

DESCRIPTION OF THE PREFERRED EMBODIMENTS

The magneto-optical read head shown in FIG. 1 has a layered structure formed on a substrate 1, shown in a position for reading data from a magnetic recording medium 11. Magnetic transitions in the recording medium 11 are schematically indicated by arrows between vertical lines schematically illustrating the respective bit lengths.

The substrate 1 is composed of material that is transparent to light of the employed wavelength, and is preferably composed of GGG.

The substrate 1 has a reflecting surface 2, which produces total internal reflection of an incoming laser beam 3 at the employed wavelength. The outgoing laser beam 4 is modulated by the other layers described below so as to contain information corresponding to the data represented by the magnetic transitions in the recording medium 11.

After being reflected from the surface 2, the laser beam 3 proceeds through a transparent shield material layer 5 so as to interact with a sense layer 7. The sense layer 7 is composed of material which has at least one optical property that is magnetic field-dependent, such as exhibiting a high Kerr effect. As a result in the modification of this optical property by the magnetic flux due to the magnetic transitions representing the data stored in the storage medium 11, the outgoing laser beam 4 is modulated so as to contain information representing the stored data, in a known manner. The sense layer 7 has layers 6 and 8 of gap material on opposite sides thereof, forming a sandwich between the transparent shield layer 5 and another shield layer 9. It is irrelevant whether the shield layer 9 is transparent to light at the employed wavelength, since there is no need for the light to pass therethrough.

By shielding the sense layer 7 on both sides with the transparent shield layer 5 and the shield layer 9, magnetic flux arising from transitions other than the transition disposed immediately adjacent to the sense layer 7 is substantially prevented from interacting with the sense layer 6, so that the aforementioned modification of the optical property of the sense layer 7 is due almost exclusively to the magnetic flux produced by the immediately adjacent transition. This allows the magnetic transitions to be spaced more closely together, thereby shortening the bit length, and thereby increasing the linear density of the data which can be read by the inventive magneto-optical head. A protective (passivation) layer 10 is disposed in the other side of the shield layer 9 and serves for protection against corrosion and mechanical damage.

The material forming the transparent shield layer 5 is preferably soft magnetic (high permeability) material that is substantially transparent to light at the employed wavelength. The material forming the transparent shield layer 5 is preferably made of garnet having a composition $A_3X_5O_{12}$, wherein A is one or more of Y, Bi, or any rare earth element, X is one or more of Fe, Ga, Al, In, Sc, Sm and Nd. Examples of a suitable composition for the transparent shield layer 5 are $(Lu_{2.5}Bi_{0.5})(Fe_5)O_{12}$ and $(Tm_{2.5}Bi_{0.5})(Fe_4Ga_1)O_{12}$.

The material forming the transparent shield layer 5 should have approximately the same index of refraction as the material forming the substrate 1. Preferably, the material forming the transparent shield layer 5 exhibits a low Kerr rotation and a low Faraday rotation. The thickness of the transparent shield material layer 5 will depend on the permeability of the material forming that layer, however, typically the transparent shield layer 5 will have a thickness in a range between 1 and 2 $\mu$m.

The material forming the gap layers 6 and 8 is nonmagnetic material that is substantially transparent to light at the employed wavelength. The gap material also is preferably electrically insulating, so as to avoid eddy currents at high frequencies. Preferably the gap material has approximately the same index of refraction as the transparent shield layer 5. Examples of preferable materials for forming the gap layers 6 and 8 are $Si_3N_4$, $SiO_2$ and $Al_2O_3$. The thickness of the gap layers 6 and 8 will be selected as a compromise between the linear density requirement (higher linear density requires thinner gap material) and the amplitude requirement (higher amplitude requires thicker gap material).

The sense layer 7 is composed of soft magnetic reflective material exhibiting a high Kerr effect. The sense layer 7 also should have a high permeability and uniaxial in-the-layer-plane anisotropy. The sense layer 7 is preferably composed of amorphous CoZr, with cobalt in a range of 90–98 at % and Zr in a range between 2 and 10 at %. Possible additional elements in the sense layer 7 may be one or more of Mo,Ta,Nb,Pt and Ni, with the total of such additional elements being less than 5 at %. The thickness of the sense layer will typically be less than 2000 Å, preferably less than 500 Å.

The material forming the shield layer 9 has the same magnetic requirements as the transparent shield material 5, however, it is not required to be transparent. Although the same material can be used for the shield layer 9 as for the transparent shield layer 5, it is also feasible, for cost reasons, to use some other material which may be less expensive. Suitable materials for the shield layer 9 are NiFe (Permalloy), CoZr (possibly with additions), and other materials.

The embodiment of the inventive magneto-optical read head shown in FIG. 2 has the same basic layer structure as the embodiment described above in connection with FIG. 1, but additionally has support structure 12 disposed on each side of the structure described above in connection with FIG. 1. The presence of this support structure 12 improves the head/tape interface and makes it easier to integrate the magneto-optical read head with the remainder of the system and to provide further protection to the structure shown in FIG. 1 from damage and wear.

Also in the embodiment of FIG. 2, instead of relying on total internal reflection produced by the surface 2 as in the embodiment of FIG. 1, a reflective layer 13 is provided between the support structure 12 and the substrate 1. The reflecting layer 13 can be composed of any suitable highly reflecting material, and produces substantially complete reflection at the point of incidence 14 of the incoming beam 3.

An additional reflective layer can be disposed between the sense layer 7 and the gap layer 8 to increase the reflection. Although this may increase the intensity of the outgoing modulated beam 4, such an additional reflective layer may limit the frequency response of the read head, because highly reflective materials typically are also good conductors, and will therefore exhibit high eddy currents at high frequency.

Another alternative is to form the gap layer 8 of material which highly absorbs light at the employed wavelength. This will decrease any parasitic reflection which may occur from the surface of the shield material 9, but may possibly decrease the signal-to-noise ratio of the read head.

A further alternative is to select the respective indices of refraction of the layers 6 and 7, as well as the layers 7 and 8, so as increase reflectivity between those layers. As is known, the coefficient of reflection R of an interface between a material with a refractive index $N_0$ and another material with a (complex) refractive index $N_1$ is $$R = \left|\frac{N_1 - N_0}{N_1 + N_0}\right|^2$$

The coefficient of reflection R should be optimized to produce high reflectivity.

Another possibility is optimize the thickness of the gap layer 6 and the reflectivity at the interface between the transparent shield layer 5 and the gap layer 6, in order to produce multiple reflections of the laser light by resonance from the sense layer 7. This will increase the total Kerr rotation, because rotation will take place for every reflection, thus multiple reflections produce a high rotation.

In the embodiment of FIG. 2, a material can be selected for the layer 10 which is suitable for wafer bonding to the support material 12.

The basic components of a read-out system employing the embodiment shown in FIG. 2 of the inventive magneto-optical read head is shown in FIG. 3. The system shown in FIG. 3, of course, also can be used with the embodiment shown in FIG. 1. Except for the inventive magneto-optical read head, the system shown in FIG. 3 is conventionally constructed, and is but one example of any type of known read-out system which can be used.

In the embodiment of FIG. 3, a laser beam is generated by a laser 1, which is collimated in a collimating lens 32, and which is shaped to form a parallel beam in a beam shaping lens 33. The parallel beam proceeds through a beam splitter 34, and exits therefrom as the incoming laser beam 3 described above. The laser beam passes through an objective lens 35 and interacts with magneto-optical read head in the manner described above, to produce the modulated laser beam 4. The modulated laser beam 4 proceeds through the beam splitter 34 and is reflected therein toward an analyzer 36 such as polarizer. If the analyzer 36 is a polarizer, a polarized beam 37 then proceeds through an imaging lens 37 to a detector 39.

Although modifications and changes may be suggested by those skilled in the art, it is the intention of the inventors to embody within the patent warranted hereon all changes and modifications as reasonably and properly come within the scope of their contribution to the art.

We claim as our invention:

1. A magneto-optical read head for detecting magnetic transitions representing data stored in a magnetic recording medium, comprising:
   a sense layer having an optical property that is magnetic field-dependent;
   two magnetic shield layers respectively disposed on opposite sides of said sense layer and allowing magnetic flux from substantially only one of said magnetic transitions to interact with said sense layer at a time; and
   one of said magnetic shield layers being transparent at a wavelength and allowing light at said wavelength to enter into and exit from said sense layer.

2. A magneto-optical read head as claimed in claim 1 wherein said one of said magnetic shield layers is composed of garnet.

3. A magneto-optical read head as claimed in claim 2 wherein said one of said magnetic shield layers has a composition $A_3X_5O_{12}$, wherein A is at least one element selected from the group consisting of Y, Bi, and all rare earth elements, wherein X is at least one element selected from the group consisting of Fe, Al, Ga, In, Sc, Sm and Nd.

4. A magneto-optical read head as claimed in claim 3 wherein said one of said magnetic shield layers has a composition selected from the group consisting of $(Lu_{2.5}Bi_{0.5})(Fe_5)O_{12}$ and $(Tm_{2.5}Bi_{0.5})(Fe_4Ga_1)O_{12}$.

5. A magneto-optical read head as claimed in claim 1 wherein said one of said magnetic shield layers has low Kerr rotation and low Faraday rotation.

6. A magneto-optical read head as claimed in claim 1 wherein said one of said magnetic shield layers has a thickness in a range between 1 and 2 $\mu$m.

7. A magneto-optical read head as claimed in claim 1 further comprising non-magnetic gap material disposed on opposite sides of said sense layer, respectively between said sense layer and said magnetic shield layers.

8. A magneto-optical read head as claimed in claim 7 wherein said one of said magnetic shield layers has a refractive index, and wherein said gap material has a refractive index substantially equal to the refractive index of said one of said magnetic shield layers.

9. A magneto-optical read head as claimed in claim 7 wherein said gap material is electrically insulating material.

10. A magneto-optical read head as claimed in claim 7 wherein said gap material is composed of material selected from the group consisting of $Si_3N_4SiO_2$ and $Al_2O_3$.

11. A magneto-optical read head as claimed in claim 1 wherein said sense layer is composed of soft magnetic material exhibiting high Kerr rotation.

12. A magneto-optical read head as claimed in claim 11 wherein said sense layer is composed of material having a high permeability and uniaxial in-the-layer-plane anisotropy.

13. A magneto-optical read head as claimed in claim 11 wherein said sense layer comprises amorphous CoZr with Co in a range between 90–98 at % and Zr in a range between 2–10 at %.

14. A magneto-optical read head as claimed in claim 13 wherein said sense layer comprises at least one additional element selected from the group consisting of Mo, Ta, Nb, Pt and Ni, in an amount less than 5 at %.

15. A magneto-optical read head as claimed in claim 11 wherein said sense layer has a thickness of less than 2000 Å.

16. A magneto-optical read head as claimed in claim 1 comprising a substrate having a generally trapezoidal cross-section with two non-parallel sides, said one of said magnetic shield layers being disposed on one of said two non-parallel sides and the other of said two non-parallel sides producing total internal reflection in said substrate to direct incoming light through said one of said magnetic shield layers to said sense layer.

17. A magneto-optical read head as claimed in claim 16 wherein said substrate is composed of GGG.

18. A magneto-optical read head as claimed in claim 16 further comprising a protective layer disposed on the other of said magnetic shield layers at a side thereof facing away from said sense layer.

19. A magneto-optical read head as claimed in claim 18 wherein said protective layer is composed of material selected from the group consisting of $Si_3N_4$ and $SiO_2$.

20. A magneto-optical read head as claimed in claim 1 comprising a substrate, having a generally trapezoidal cross-section with two non-parallel sides, said one of said magnetic shield layers being disposed on one of said non-parallel sides, and further comprising a reflective layer disposed on the other of said non-parallel sides of said substrate for reflecting incoming light through said one of said magnetic shield layers to said sense layer.

21. A magneto-optical read head as claimed in claim 20 wherein said reflective layer is composed of material selected from the group consisting of Al, Ag and Au.

22. A magneto-optical read head as claimed in claim 20 further comprising a first support structure disposed on said reflective layer and a second support structure disposed at a side of the other of said magnetic shield layers facing away from said sense layer, said first and second support structures having respective cross sections which are complementary to said trapezoidal cross section of said substrate, so that said first and second support structures, said substrate, said magnetic shield layers and said sense layer, in combination, have a substantially rectangular cross-section.

23. A method for optically detecting magnetic transitions in a magnetic recording medium representing data stored in the magnetic recording medium, comprising the steps of:

disposing a magneto-optical read head adjacent to said magnetic recording medium, said magneto-optical read head containing a sense layer having an optical property that is magnetic field-dependent;

shielding said sense layer in said magneto-optical read head with two magnetic shield layers respectively disposed in said magneto-optical read head on opposite sides of said sense layer to allow magnetic flux from substantially only one of said magnetic transitions to interact with said sense layer at a time;

passing an incoming light beam through one of said magnetic shield layers to said sense layer wherein said incoming light beam interacts with said sense layer in the presence of said magnetic flux to produce a modulated outgoing light beam containing information corresponding to said data; and passing said modulated outgoing light beam from said sense layer through said one of said magnetic shield layers.

24. A method as claimed in claim 23 comprising providing a substrate having a generally trapezoidal cross section with two non-parallel sides and disposing said two magnetic shield layers, with said sense layer therebetween, on one of said non-parallel sides, and wherein the step of passing incoming light through said one of said magnetic shield layers comprises reflecting said incoming light at the other of said non-parallel sides of said substrate with total internal reflection in said substrate.

25. A method as claimed in claim 23 comprising providing a substrate having a generally trapezoidal cross section with two non-parallel sides and disposing said two magnetic shield layers, with said sense layer therebetween, on one of said non-parallel sides, and wherein the step of passing incoming light through said one of said magnetic shield layers comprises providing a reflective layer on the other of said non-parallel surfaces and reflecting said incoming light from said reflective surface toward said one of said magnetic shield layers.

26. A magneto-optical read system for detecting magnetic transitions representing data stored in a magnetic recording medium, comprising:

a light source which emits light at a wavelength;

a magneto-optical read head disposed in a path of said light, said magneto-optical read head comprising a sense layer having an optical property that is magnetic field-dependent, two magnetic shield layers respectively disposed on opposite sides of said sense layer and allowing magnetic flux from substantially only one of said magnetic transitions to interact with said sense layer at a time, one of said magnetic shield layers being transparent at said wavelength to allow said light at said wavelength to enter into and exit from said sense layer, said light interacting with said sense layer in the presence of said magnetic flux to produce modulated light containing information corresponding to said data; and a detector disposed in a path of said modulated light to detect said information contained in said modulated light.

* * * * *